United States Patent
Cawley (10) Patent No.: US 11,543,140 B2
(45) Date of Patent: Jan. 3, 2023

(54) COMBINATION HUMIDIFIER / DEHUMIDIFIER WITH COMMON WATER CONTAINMENT AND OUTDOOR AIR INTAKE

(71) Applicant: Christopher Cawley, Massapequa, NY (US)

(72) Inventor: Christopher Cawley, Massapequa, NY (US)

(*) Notice: Subject to any disclaimer, the term of this patent is extended or adjusted under 35 U.S.C. 154(b) by 76 days.

(21) Appl. No.: 17/203,954

(22) Filed: Mar. 17, 2021

(65) Prior Publication Data

US 2021/0381705 A1  Dec. 9, 2021

Related U.S. Application Data

(60) Provisional application No. 63/035,226, filed on Jun. 5, 2020.

(51) Int. Cl.

| *F24F 6/04* | (2006.01) |
|---|---|
| *B01F 23/21* | (2022.01) |
| *B01D 46/00* | (2022.01) |
| *F24F 8/22* | (2021.01) |
| *F24F 8/108* | (2021.01) |
| *B01D 46/44* | (2006.01) |
| *B01D 53/00* | (2006.01) |
| *B01D 53/26* | (2006.01) |
| *B01D 46/46* | (2006.01) |

(Continued)

(52) U.S. Cl.
CPC ............ *F24F 6/04* (2013.01); *B01D 46/0005* (2013.01); *B01D 46/0028* (2013.01); *B01D 46/448* (2013.01); *B01D 46/46* (2013.01); *B01D 50/00* (2013.01); *B01D 53/007* (2013.01); *B01D 53/265* (2013.01); *B01F 23/21* (2022.01); *F24F 8/108* (2021.01); *F24F 8/22* (2021.01); *B01D 2279/50* (2013.01); *F24F 2006/008* (2013.01); *F24F 2110/20* (2018.01); *F24F 2110/22* (2018.01)

(58) Field of Classification Search
CPC ...... B01F 23/21; B01D 46/0005; B01D 50/00
See application file for complete search history.

(56) References Cited

U.S. PATENT DOCUMENTS

| 6,355,091 B1 | 3/2002 | Felber et al. |
|---|---|---|
| 6,796,550 B2 * | 9/2004 | Mulvaney ............ F24F 11/0008 73/29.02 |

(Continued)

FOREIGN PATENT DOCUMENTS

| CA | 2520975 A1 | 4/2007 | |
|---|---|---|---|
| CA | 2770988 A1 * | 2/2011 | ............. B01D 45/14 |
| CN | 209484735 U * | 10/2019 | |

*Primary Examiner* — Robert A Hopkins
(74) *Attorney, Agent, or Firm* — Michael J. Feigin, Esq.; Feigin and Fridman LLC (57) ABSTRACT

A humidifier/dehumidifier device is disclosed herein. The humidifier and dehumidifier both, respectively, evaporate water from and condense water into a shared (same) water storage container. The device is fitted with an air intake and at least one air outtake. In embodiments of the technology, one or more of the air intakes receives air from outdoors. One or both of an indoor and/or the outdoor intake is used to receive air based on a determination that an indoor and outdoor humidity and temperature is most efficient to achieve a desired indoor humidity or temperature.

16 Claims, 7 Drawing Sheets

(51) Int. Cl.
  *B01D 50/00*  (2022.01)
  *F24F 110/20*  (2018.01)
  *F24F 110/22*  (2018.01)
  *F24F 6/00*  (2006.01)

(56) References Cited

U.S. PATENT DOCUMENTS

| 8,328,904 B2 | 12/2012 | Griffiths et al. |
| 2008/0022705 A1 | 1/2008 | Clearman |
| 2014/0261764 A1 | 9/2014 | Kohavi et al. |
| 2015/0285524 A1 | 10/2015 | Saunders |

* cited by examiner

COMBINATION HUMIDIFIER / DEHUMIDIFIER WITH COMMON WATER CONTAINMENT AND OUTDOOR AIR INTAKE

FIELD OF THE DISCLOSED TECHNOLOGY

The disclosed technology relates to humidity regulation, and more specifically, to regulation based on condensation into, and evaporation from, a common water container.

BACKGROUND

Coronavirus, which has rocked the world, is known to spread in the air. Air purification is needed more than ever at this time. Thus, new, cost-effective and improved methods of air purification and filtration are necessary.

Additionally, there are several well-known advantages to having spaces kept within a certain range of air humidity levels. This maintenance can be expensive and difficult, since it typically requires the separate purchase of a humidifier and dehumidifier. The owner must remember to make sure that both are set to run when needed, and that other necessary actions, such as providing a water supply for the humidifier, are performed.

Therefore, there is a need in the art for a single device which streamlines all three of these air-regulation mechanisms (filtration, humidification, and dehumidification) in a convenient and cost-effective way.

SUMMARY OF THE DISCLOSED TECHNOLOGY

An interior-space ambient humidity- and temperature-adjusting device having an air intake and air outtake is used to adjust the same by way of condensation and evaporation of water from a container. Interior and exterior air is taken into the device in order to accomplish this goal, in embodiments of the disclosed technology.

An air filter is functionally situated between the air intake and air outtake. The device also has a first humidity gauge which detects a level of water vapor in ambient air in an interior space and a second humidity gauge which detects a level of water vapor in ambient air in an exterior space. A container, which holds water in some embodiments of the disclosed technology, is used for water exchange, whereby water is condensed from vapor when dehumidifying and placed into the container. In embodiments, the device also has a humidifier functionally situated between the container and the air outtake which, when operating, draws water from the water container and expels air to the outtake. The intakes and outtakes can include multiple such devices with at least one of each functionally connected to an interior space and one functionally connected to an exterior space. The air expelled to the outtake is more humid than the ambient air.

In embodiments, the device also has a dehumidifier which, when operating, causes water vapor in air entering through the air intake to condense the water vapor into the water container. It also has, in various embodiments, a purification mechanism acting to purify water entering into and/or exiting from the water container. In embodiments, the humidifier and dehumidifier are substantially configured to refrain from operation at a same time.

Further, in embodiments of the disclosed technology, the first humidity gauge activates the humidifier when the ambient humidity is below a first pre-set humidity level and activates the dehumidifier when the ambient humidity is above a second pre-set humidity level. In embodiments, there is a desired ambient humidity level which is any level in a range which is substantially 50% of a maximum possible air humidity level and 30% of a minimum possible air humidity level.

The air intake is, in embodiments of the disclosed technology, an inside air intake and an outside air intake. In further embodiments, the device has a temperature gauge. In various embodiments, in a case in which a measured outside ambient temperature is above a first pre-set temperature level and a measured outside ambient humidity level is above the second pre-set humidity level, the outside air intake is opened, and in a case in which a measured outside ambient temperature is below a second pre-set temperature level and a measured outside ambient humidity level is below the first pre-set humidity level, the outside air intake is closed. In other embodiments, based on a comparison between a measured inside ambient temperature and a measured outside ambient temperature and/or based on a comparison between a measured inside ambient humidity level and a measured outside ambient humidity level, one of the inside air intake and the outside air intake is used and/or not used.

In some embodiments, the purification mechanism is a boiler.

A method for adjusting ambient humidity level, which has steps (in any order) of: receiving air into an air intake and expelling air through an air outtake, filtering the air with an air filter functionally situated between the air intake and air outtake, detecting a level of water vapor in ambient air in an interior space using a first humidity gauge, detecting a level of water vapor in ambient air in an exterior space using a second humidity gauge, condensing water vapor in air entering through the air intake into the water container using a dehumidifier, storing condensed water in a water container, drawing water from the water container and expelling air to the outtake (the air being more humid than the ambient air) using a humidifier functionally situated between the container and the air outtake, and purifying water entering into and/or exiting from the water container with a purification mechanism. In embodiments, the humidifier and dehumidifier are substantially configured to refrain from operation at a same time.

In embodiments, the air intake and/or air outtake contain a source of light in the UV-C band (255 to 280 nanometers), which is known to kill viruses effectively. Substantially all of the air in the air intake and/or air outtake is moved past this source of light as an additional air filtration method.

Further, in some embodiments, there is an additional step of activating the humidifier based on the first humidity gauge detecting that the ambient humidity is below a first pre-set humidity level and/or activating the dehumidifier in response to detecting, using the first humanity gauge, that the ambient humidity is above a second pre-set humidity level. In embodiments, there is a desired ambient humidity level which is a range which is substantially 50% of a maximum possible air humidity level and 30% of a minimum possible air humidity level.

In various embodiments, the air intake further comprises an inside air intake and an outside air intake.

The disclosed method, in embodiments, further has the steps of, in any functional/reasonable order: measuring an outside ambient temperature with a temperature gauge and measuring an outside ambient humidity level with the second humidity gauge. In a case in which a measured outside ambient temperature is above a first pre-set temperature level and a measured outside ambient humidity level is above the second pre-set humidity level, the method includes the step of opening the outside air intake, and in a case in which a measured outside ambient temperature is below a second pre-set temperature level and a measured outside ambient humidity level is below the first pre-set humidity level, the method includes the step of closing the outside air intake. Further, in some embodiments, the method has a step of using one of the inside air intake and the outside air intake based on a comparison between a measured inside ambient temperature and a measured outside ambient temperature and/or based on a comparison between a measured inside ambient humidity level and a measured outside ambient humidity level.

In embodiments, the method further has a step of boiling in order to purify the water entering into and/or exiting from the water container. In other embodiments, the method has an additional step of passing substantially all of the air in the air intake and/or air outtake past a source of light in the UV-C band (255 to 280 nanometers), which is known to kill viruses effectively.

DETAILED DESCRIPTION OF EMBODIMENTS OF THE DISCLOSED TECHNOLOGY

Embodiments of the disclosed technology will become more clear in view of the following discussion of the figures.

Figure 1:
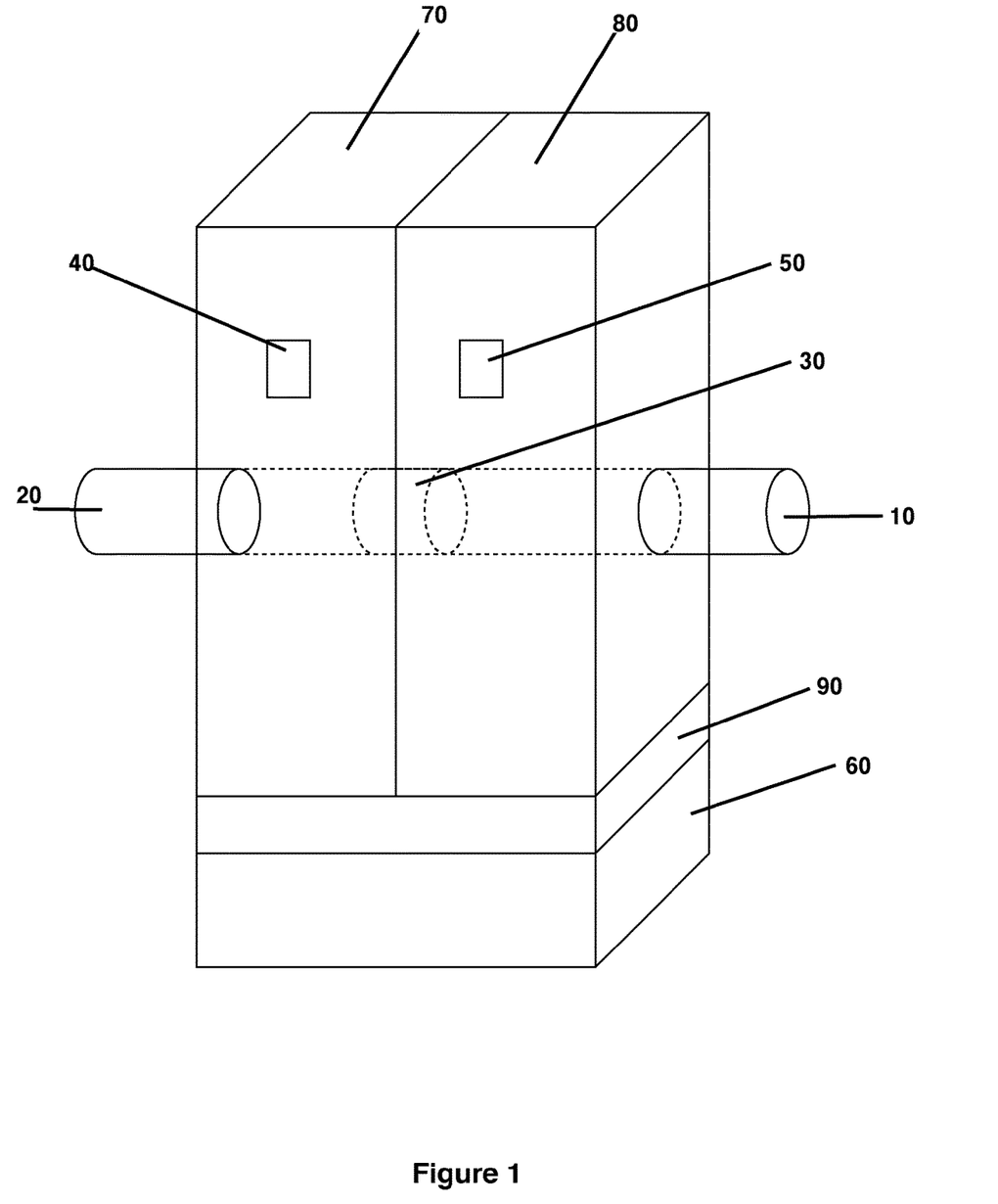
FIG. 1 is a front elevational view of an air humidifier/dehumidifier device of embodiments of the disclosed technology.

FIG. 1 is a front elevational view of an air humidifier/dehumidifier device of embodiments of the disclosed technology. The figure shows an air outtake 10 and air intake 20, with an air filter 30 functionally situated between them. It also shows a first humidity gauge 40 which detects a level of water vapor in ambient air in an interior space and a second humidity gauge 50 which detects a level of water vapor in ambient air in an exterior space. Also shown are a water container 60 and a connected purification mechanism 90. The purification mechanism 90 is situated at substantially all entrances into and/or exits from the water container 60, and acts to purify all water entering and/or exiting the water container 60. This purification mechanism takes one or more of a plurality of forms, such as a boiler, an ionizer, or a distiller. A humidifier 70 is functionally situated between the water container 60 and the air outtake 10, and is capable of, at the very least, drawing water from the water container 60, vaporizing some or all of the water drawn, and expelling the vaporized water through air outtake 10. A dehumidifier 80 is functionally situated between the water container 60 and the air intake 20, and is capable of, at the very least, drawing air from the air intake 10, condensing some or all of the water vapor in the air drawn, and storing the condensed water vapor into water container 60. Both the water drawn from water container 60 by the humidifier 70 and the water stored in water container 60 by the dehumidifier 80 are passed through the water purification mechanism 90 at least once.

Figure 2:
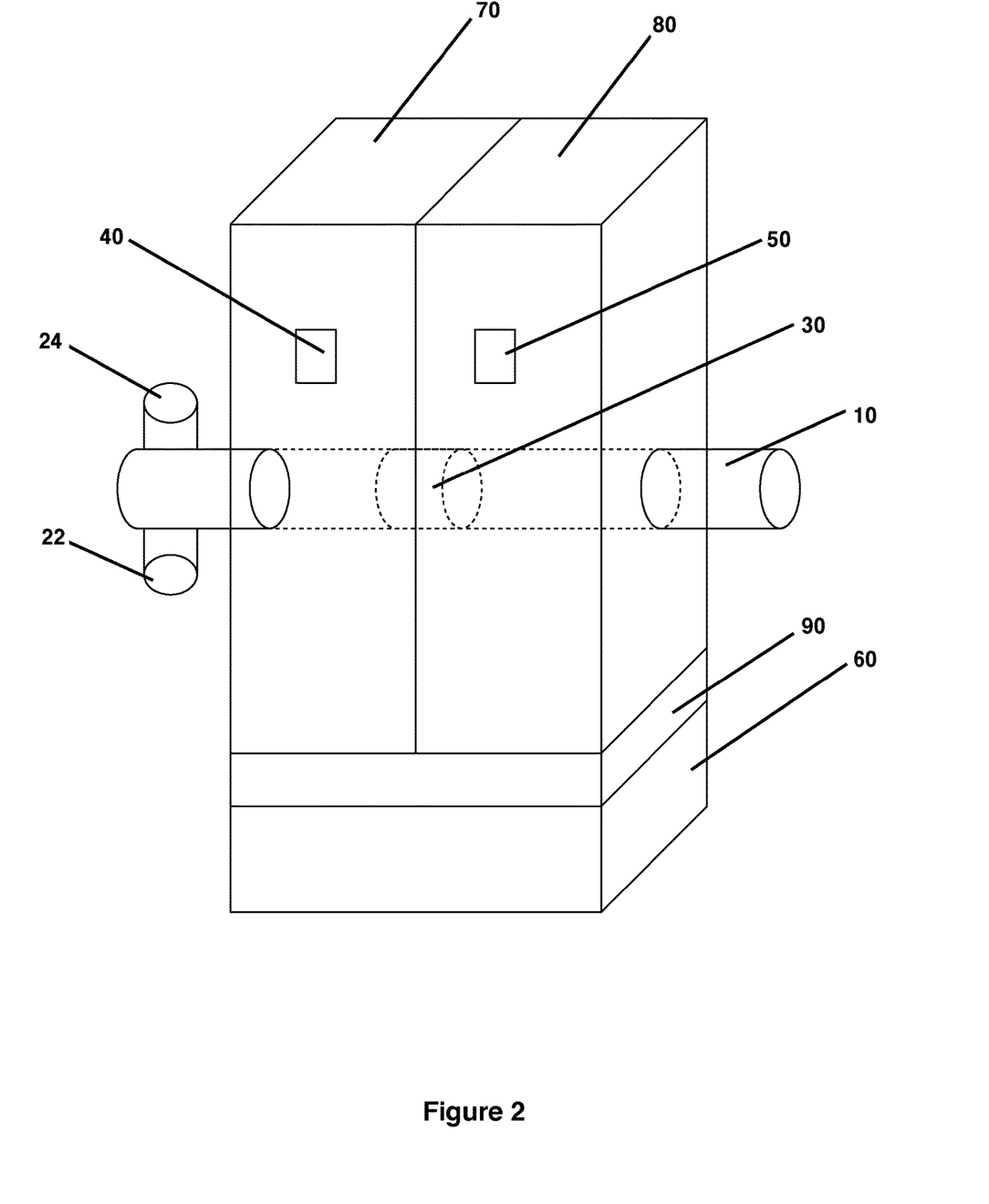
FIG. 2 is a front elevational view of the air humidifier/dehumidifier device with an alternate air intake system in other embodiments of the disclosed technology.

FIG. 2 is a front elevational view of the air humidifier/dehumidifier device of other embodiments of the disclosed technology. In addition to what is shown in FIG. 1, here an outside air intake 22 and an inside air intake 24. Outside air intake 22 leads to an exterior space and inside air intake 24 leads to an interior space.

Figure 3:
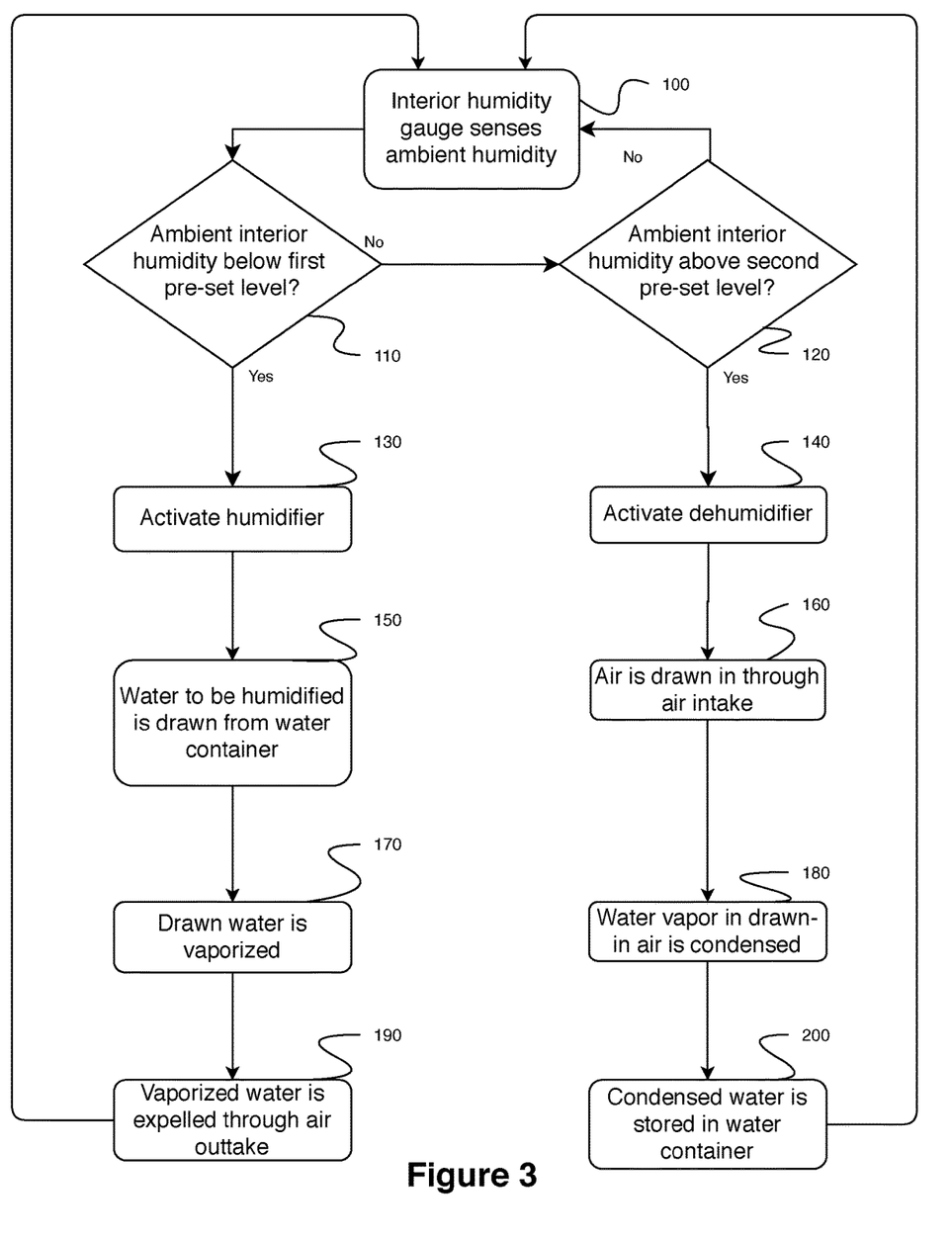
FIG. 3 shows a method of turning on an air humidifier/dehumidifier device in embodiments of the disclosed technology.

FIG. 3 shows a flow chart of steps used to carry out embodiments of the disclosed technology. In step 100, an interior humidity gauge 40 senses ambient humidity in an interior space. In step 110, the ambient humidity is compared to a first pre-set level. This first pre-set level is substantially equal to 30% of a minimum possible air humidity level, which is known in the prior art to be substantially the lowest ambient humidity level which is beneficial to human health. If the ambient humidity is below the first pre-set level, then the humidifier 70 is turned on in step 130. This leads to steps 150, 170, and 190, in which the humidifier 70, respectively, draws water from the water container 60, vaporizes it, and expels the water vapor through the air outtake 10. During step 150 of drawing water, the water drawn from the water container 60 also passes through the purification mechanism 90, as described above.

If the ambient humidity is above the first pre-set level, it is compared to a second pre-set level in step 120. This second pre-set level is substantially equal to 50% of a maximum possible air humidity level, which is known in the prior art to be substantially the highest ambient humidity level which is beneficial to human health. If the ambient humidity is above the second pre-set level, then the dehumidifier is turned on in step 140. This leads to steps 160, 180, and 200, in which the dehumidifier 80, respectively, draws in air from the air intake 20, condenses the water vapor in it, and stores the condensed water in the water container 60. During step 200 of storing the condensed water in water container 60, the condensed water is passed through the purification mechanism 90, as described above. A "container" is defined herein as "storage tank or connected storage tanks which are water-tight but for portals used for liquid entry and exit." If the ambient humidity is above the second pre-set level, step 100 is begun again. Thus when the humidifier 70 is operating for its intended primary function, the dehumidifier 80 is prevented from operating for its intended primary function, and vice versa. Through this method, the ambient interior humidity level is kept within a range which is known in the prior art to be beneficial for human health. In some embodiments, the first and second pre-set levels may be programmed by a user to be set at other levels.

Figure 4:
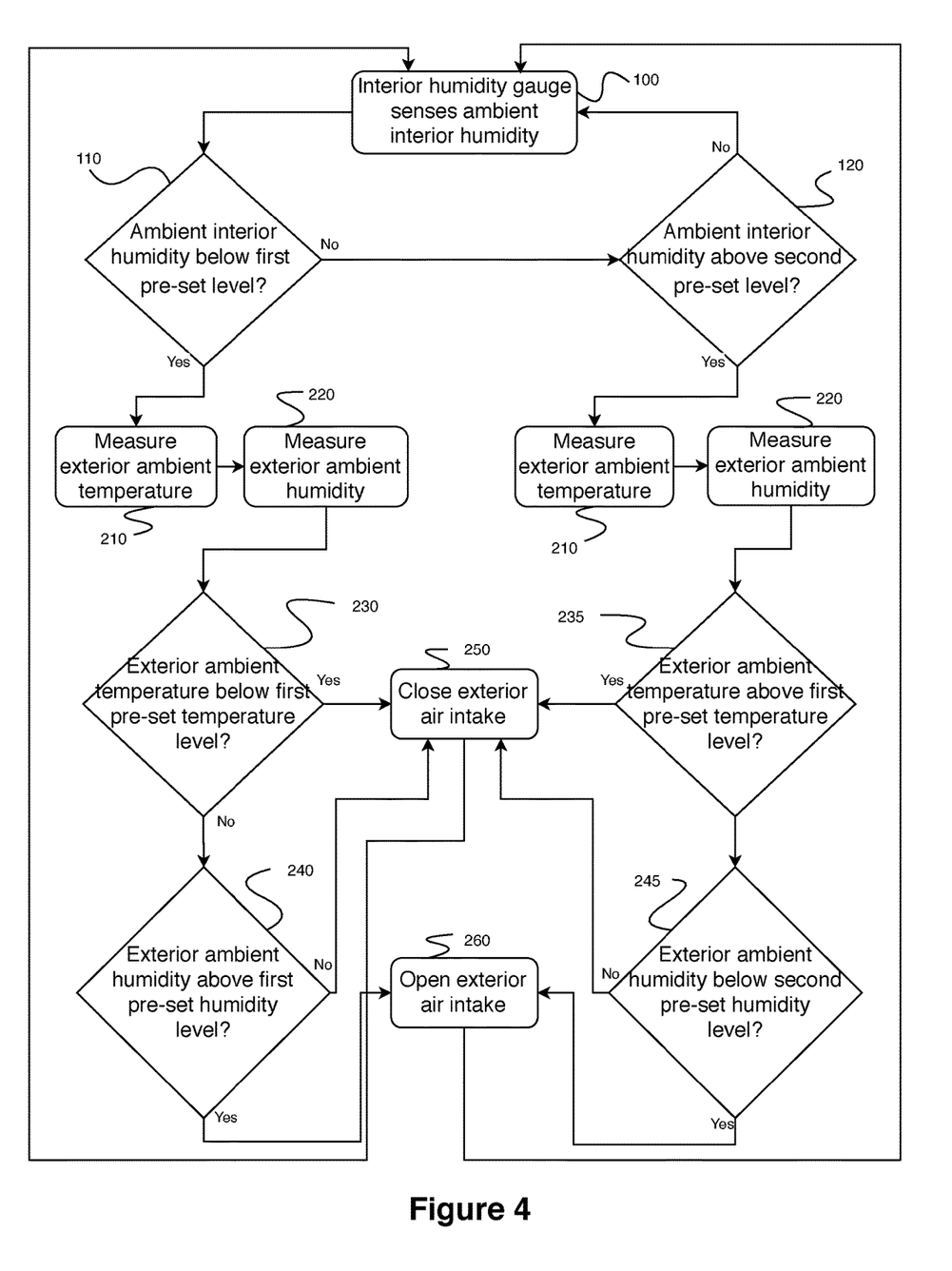
FIG. 4 shows a method of opening and/or closing an outside air intake of an air humidifier/dehumidifier device in embodiments of the disclosed technology.

FIG. 4 shows a flow chart of steps used to determine whether to open or close the exterior air intake 22, in other embodiments of the disclosed technology. In step 100, an interior humidity gauge 40 senses ambient humidity in an interior space. In step 110, the ambient interior humidity is compared to a first pre-set level. This first pre-set level is substantially equal to 30% of a minimum possible air humidity level, which is known in the prior art to be substantially the lowest ambient humidity level which is beneficial to human health. If the ambient humidity is below the first pre-set level, then the device begins measurements to determine whether opening exterior air intake 22 would be beneficial in raising the interior humidity level to be equal to or above the first pre-set level.

In step 210, the exterior temperature gauge 52 measures exterior ambient temperature. In step 220, the exterior humidity gauge 50 measures exterior ambient humidity. The exterior ambient temperature is compared to a first pre-set temperature level in step 230. If the exterior ambient temperature is below the first pre-set temperature level, the exterior air intake 22 is closed in step 250, and step 100 is begun again. In an embodiment of the disclosed technology, the first pre-set temperature level is equal to a lowest temperature level which is known in the prior art to be useful in raising an interior humidity level.

If the exterior ambient temperature is equal to or above the first pre-set temperature level, the exterior ambient humidity level is compared to the first pre-set humidity level in step 240. This first pre-set level is substantially equal to 30% of a minimum possible air humidity level, which is known in the prior art to be substantially the lowest ambient humidity level which is beneficial to human health. If the exterior ambient level is above the first pre-set humidity level, the exterior air intake is opened in step 260 and the device begins again with step 100. If it is below the first pre-set humidity level, the exterior air intake is closed in step 250 and the device begins again with step 100.

If, in step 110, it is determined that the ambient interior humidity level is equal to or above the first pre-set level, the device proceeds to step 120, in which the ambient interior humidity is compared to a second pre-set level. This first pre-set level is substantially equal to 50% of a maximum possible air humidity level, which is known in the prior art to be substantially the highest ambient humidity level which is beneficial to human health. If the ambient humidity is above the second pre-set level, then the device begins measurements to determine whether opening exterior air intake 22 would be beneficial in lowering the interior humidity level to be equal to or below the second pre-set level.

In step 210, the exterior temperature gauge 52 measures exterior ambient temperature. In step 220, the exterior humidity gauge 50 measures exterior ambient humidity. The exterior ambient temperature is compared to a first pre-set temperature level in step 235. If the exterior ambient temperature is below the first pre-set temperature level, the exterior air intake 22 is closed in step 250, and step 100 is begun again. In an embodiment of the disclosed technology, the first pre-set temperature level is equal to a lowest temperature level which is known in the prior art to be useful in raising an interior humidity level.

If the exterior ambient temperature is equal to or below the first pre-set temperature level, the exterior ambient humidity level is compared to the first pre-set humidity level in step 245. This first pre-set level is substantially equal to 30% of a minimum possible air humidity level, which is known in the prior art to be substantially the lowest ambient humidity level which is beneficial to human health. If the exterior ambient level is below the first pre-set humidity level, the exterior air intake is opened in step 260 and the device begins again with step 100. If it is above the first pre-set humidity level, the exterior air intake is closed in step 250 and the device begins again with step 100.

This method ensures that exterior air is used by the device substantially only in cases in which the outside air would be beneficial for the goal of reaching an interior humidity level that is substantially equal to or between the levels of 30% of a minimum possible air humidity level and 50% of a maximum possible air humidity level.

"Exterior temperature gauge" is defined as "a temperature gauge which measures ambient temperature in an exterior space". "Interior temperature gauge" is defined as "a temperature gauge which measures ambient temperature in an interior space". "Exterior humidity gauge" is defined as "a humidity gauge which measures ambient humidity in an exterior space". "Interior humidity gauge" is defined as "a humidity gauge which measures ambient humidity in an interior space".

Figure 5:
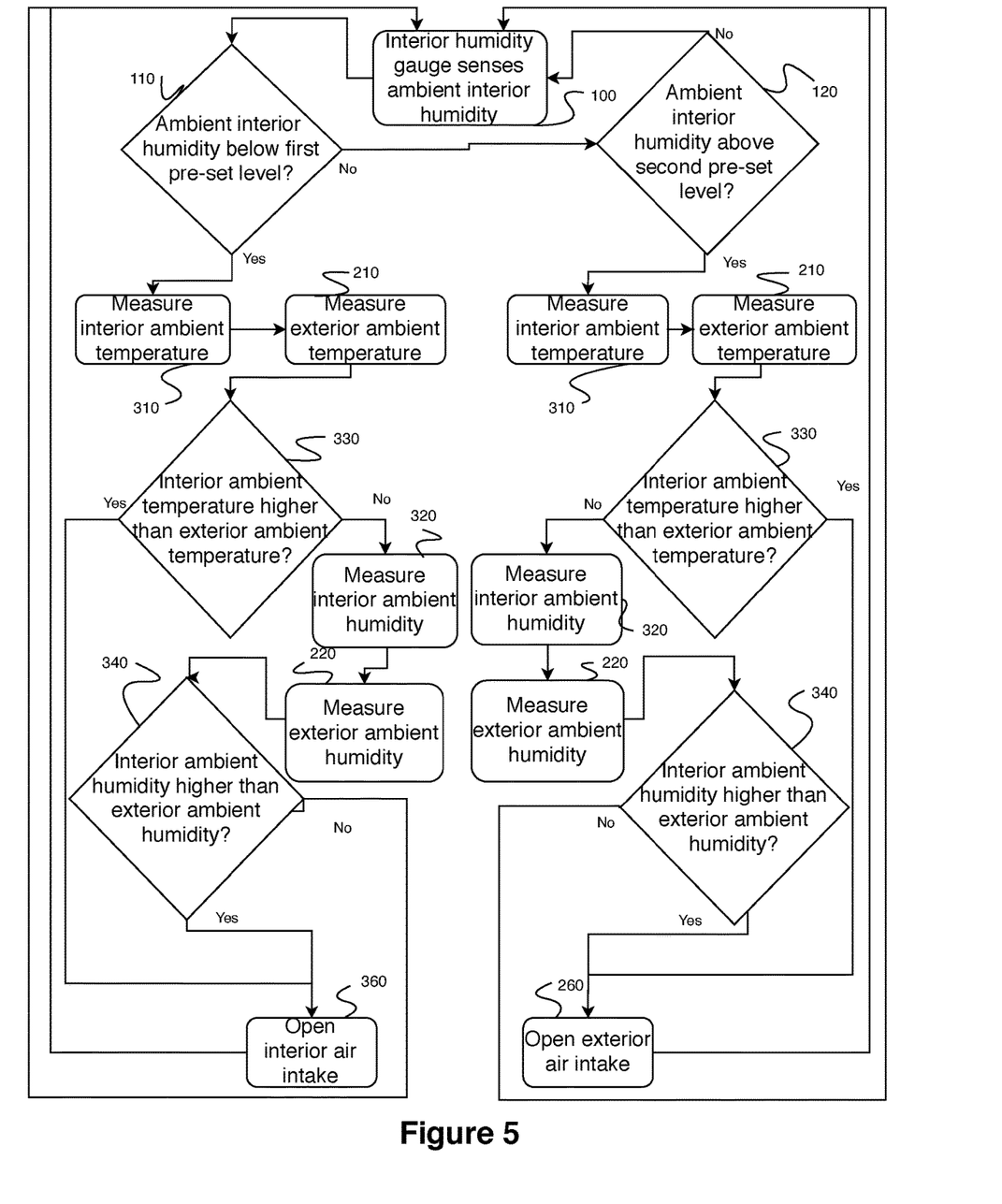
FIG. 5 shows a method of opening one of an interior and an exterior air intake based on a comparison of temperature and humidity measurements performed by an air humidifier/dehumidifier device in embodiments of the disclosed technology.

FIG. 5 shows a flow chart of steps used to determine which of inside air intake 24 and outside air intake 22 should be used, in other embodiments of the disclosed technology. In step 100, an interior humidity gauge 40 senses ambient humidity in an interior space. In step 110, the ambient interior humidity is compared to a first pre-set level. This first pre-set level is substantially equal to 30% of a minimum possible air humidity level, which is known in the prior art to be substantially the lowest ambient humidity level which is beneficial to human health. If the ambient humidity is below the first pre-set level, then the device begins measurements to determine whether opening interior air intake 24 or opening exterior air intake 24 would be beneficial in raising the interior ambient humidity level to be equal to or above the first pre-set humidity level.

In step 310, the interior temperature gauge 42 measures interior ambient temperature. In step 210, the exterior temperature gauge 52 measures exterior ambient temperature. The interior ambient temperature is compared to the exterior ambient temperature in step 330. If the interior ambient temperature is above the exterior ambient temperature, the interior air intake 24 is opened in step 360, and step 100 is begun again.

If the interior ambient temperature is below the exterior ambient temperature, in step 320 the interior humidity gauge 40 measures interior ambient humidity. In step 220, the exterior humidity gauge 50 measures exterior ambient humidity. If the interior ambient humidity is higher than the exterior ambient humidity, the interior air intake 24 is opened in step 360, and step 100 is begun again. If the interior ambient humidity is lower than the exterior ambient humidity, step 100 is begun again.

In step 110, if the ambient interior humidity is equal to or above the first pre-set level, then in step 120, the ambient interior humidity is compared to a second pre-set level. This second pre-set level is substantially equal to 50% of a maximum possible air humidity level, which is known in the prior art to be substantially the highest ambient humidity level which is beneficial to human health. If the ambient humidity is above the second pre-set level, then the device begins measurements to determine whether opening interior air intake 24 or opening exterior air intake 24 would be beneficial in lowering the interior ambient humidity level to be equal to or below the second pre-set humidity level.

In step 310, the interior temperature gauge 42 measures interior ambient temperature. In step 210, the exterior temperature gauge 52 measures exterior ambient temperature. The interior ambient temperature is compared to the exterior ambient temperature in step 330. If the interior ambient temperature is above the exterior ambient temperature, the exterior air intake 22 is opened in step 260, and step 100 is begun again.

If the interior ambient temperature is below the exterior ambient temperature, in step 320 the interior humidity gauge 40 measures interior ambient humidity. In step 220, the exterior humidity gauge 50 measures exterior ambient humidity. If the interior ambient humidity is higher than the exterior ambient humidity, the exterior air intake 22 is opened in step 260, and step 100 is begun again. If the interior ambient humidity is lower than the exterior ambient humidity, step 100 is begun again.

Thus, in this embodiment, the operation of the device is carried out based on a comparison of two measured temperatures against each other, rather than based on a comparison between a measured temperature and a pre-set temperature level.

Figure 6:
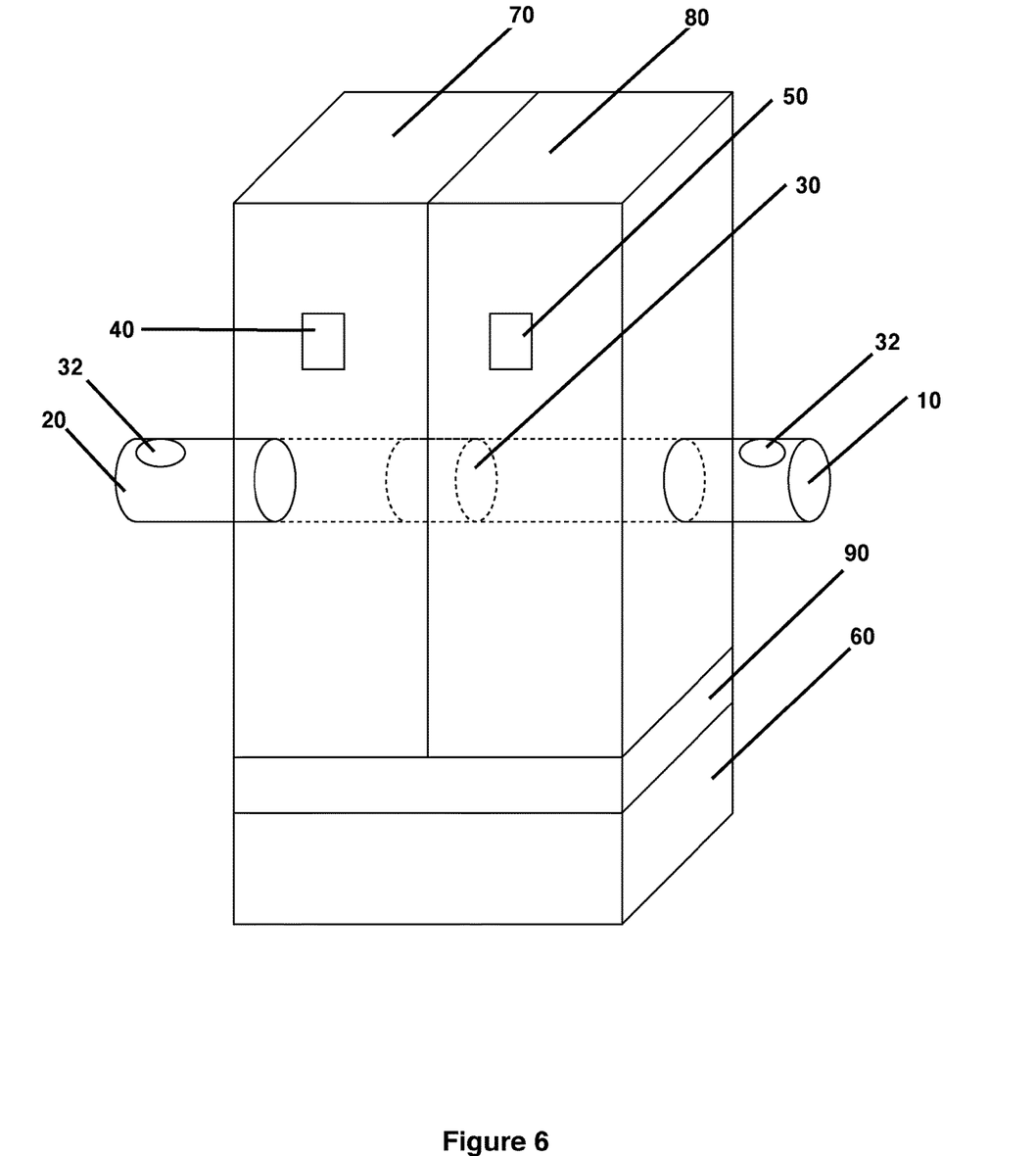
FIG. 6 is a front elevational view of the air humidifier/dehumidifier device of other embodiments of the disclosed technology.

FIG. 6 is a front elevational view of the air humidifier/dehumidifier device of other embodiments of the disclosed technology. The figure shows UV-C light sources 32 functionally situated at any point along air outtake 10 and air intake 20. The UV-C light sources 32 filter the air passing through air outtake 10 and air intake 20, in addition to the filtration performed by air filter 30.

Figure 7:
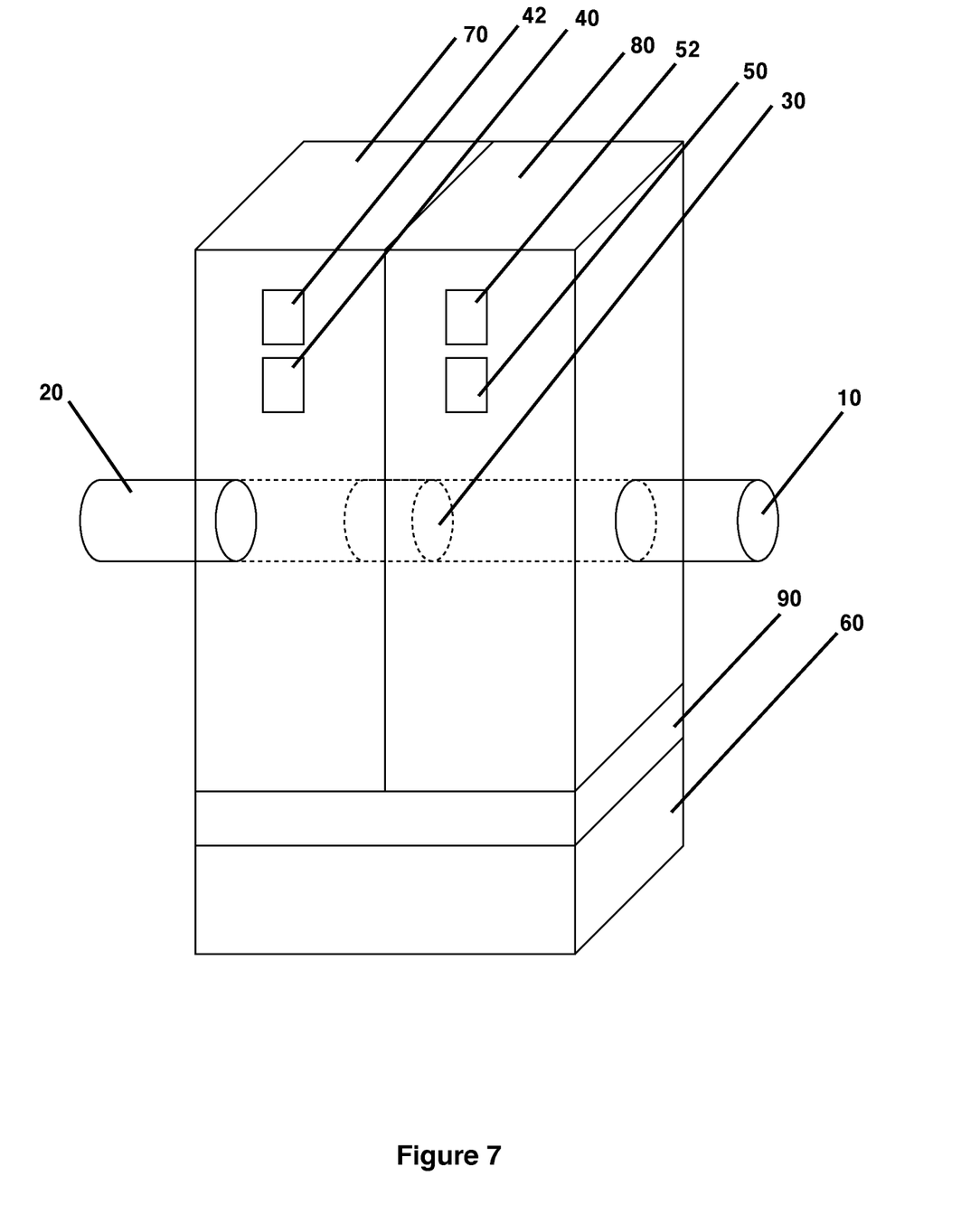
FIG. 7 is a front elevational view of the air humidifier/dehumidifier device of other embodiments of the disclosed technology

FIG. 7 is a front elevational view of the air humidifier/dehumidifier device of other embodiments of the disclosed technology. The figure shows a first temperature gauge 42 which detects a level of heat in ambient air in an interior space and a second temperature gauge 52 which detects a level of heat in ambient air in an exterior space.

Ambient humidity is defined as "an average percentage of water vapor encompassing (surrounding) a structure when exterior to the structure", or "an average percentage humidity level within a structure". Ambient temperature is defined "as an average percentage of heat encompassing (surrounding) a structure when exterior to the structure", or "an average percentage heat level within a structure".

Intake, such as intake 25, is defined as "a part of a device designed and/or used to pull ambient air into the device". Outtake is defined as "a part of a device designed and/or used to expel ambient air out of the device". Inside intake is defined as "an intake which pulls ambient air from an interior space". Outside intake is defined as "an intake which pulls ambient air from an exterior space".

Humidity gauge is defined as "a device which detects a level of water vapor present in or at a location thereof". Temperature gauge is defined as "a device which detects a level of heat present at its location thereof". Air filter is defined as "a device which removes, and is designed with a purpose or primary purpose of removal of, at least some particulate matter". Such particular matter can include viruses, and bacteria.

Humidifier is defined as "a device which increases a level of water vapor present in ambient air within a structure". Dehumidifier is defined as "a device which decreases a level of water vapor present in a structure". Structure is defined as "an enclosure, having at least three, and in some embodiments, at least four walls enclosing an space, excepting for doors, windows, and other breaks or portals in one or more of the walls while being considered an enclosed space by an ordinary observer". Humidity level is defined as "a measure of an amount of water vapor present in a defined area". Boiling is defined as "an action of bringing a liquid to the temperature at which the liquid is converted into a gas, e.g. vapor". Deionization is defined as "removal of at least some ionized minerals and salts (both organic and inorganic) from water through a process of ion exchange". Distillation is defined as "an action of boiling a liquid comprising multiple substances having different boiling points until one of the substances having a first boiling point is separated from another of the substances having a second boiling point by way of the boiling followed by condensation into a different container".

Interior space is defined as "within a place with at least three, and in some embodiments, at least four walls enclosing an space, excepting for doors, windows, and other breaks or portals in one or more of the walls while being considered an enclosed space by an ordinary observer". Exterior space is defined as "outside of an enclosed or partially enclosed structure". "Substantially configured to refrain from operation at a same time" is defined as "95% or more of a time the humidifier only operates when the dehumidifier is not operating and the dehumidifier only operates when the humidifier is not operating".

"Maximum possible air humidity level" is defined as "an air humidity level at which the air is fully or substantially fully saturated with water vapor". "Minimum possible air humidity level" is defined as "an air humidity level at which substantially no water vapor is found therein".

Any device or step to a method described in this disclosure can comprise or consist of that which it is a part of, or the parts which make up the device or step. The term "and/or" is inclusive of the items which it joins linguistically and each item by itself. "Substantially" is defined as at least 95% of the term being described and/or "within a tolerance level known in the art and/or within 5% thereof. Any device or aspect of a device or method described herein can be read as "comprising" or "consisting" thereof.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

Any device or aspect of the technology can "comprise" or "consist of" the item it modifies, whether explicitly written as such or otherwise.

When the term "or" is used, it creates a group which has within either term being connected by the conjunction as well as both terms being connected by the conjunction.

While the disclosed technology has been disclosed with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

The invention claimed is:

1. A device for adjusting ambient humidity level, comprising:
   an air intake and air outtake;
   an air filter functionally situated between said air intake and air outtake;

a first humidity gauge which detects a level of water vapor in ambient air in an interior space;

a second humidity gauge which detects a level of water vapor in ambient air in an exterior space;

a water container;

a humidifier functionally situated between said container and said air outtake which, when operating, draws water a said water container and expels air to said outtake, said air being more humid than said ambient air;

a dehumidifier which, when operating, causes water vapor in air entering through said air intake to condense said water vapor into said water container;

a purification mechanism acting to purify water entering into and/or exiting from said water container;

wherein said humidifier and dehumidifier are substantially configured to refrain from operation at a same time;

wherein said air intake comprises an inside air intake and an outside air intake; and said device further comprises a first temperature gauge and a second temperature gauge, wherein in a case in which a measured outside ambient temperature measured by said second temperature gauge is above a first pre-set temperature level and a measured outside ambient humidity level is above a second pre-set humidity level, said outside air intake is opened.

2. The device of claim 1, wherein said first humidity gauge activates said humidifier when said ambient humidity is below a first pre-set humidity level.

3. The device of claim 2, wherein said first humidity gauge activates said dehumidifier when said ambient humidity is above said second pre-set humidity level.

4. The device of claim 1, wherein said dehumidifier is activated when said ambient humidity level is substantially at or above 50% of a maximum possible air humidity level and said humidifier is activated when said ambient humidity level is at or above 30% of a minimum possible air humidity level.

5. The device of claim 2, wherein in a case in which a measured outside ambient temperature measured by said second temperature gauge is below a second pre-set temperature level and a measured outside ambient humidity level is below said first pre-set humidity level, said outside air intake is closed.

6. The device of claim 1 wherein based on a comparison between a measured inside ambient temperature by said first temperature gauge and a measured outside ambient temperature by said second temperature gauge, one of said inside air intake and said outside air intake is used and/or not used.

7. The device of claim 1, wherein based on a comparison between a measured inside ambient humidity level and a measured outside ambient humidity level, one of said inside air intake and said outside air intake is used and/or not used.

8. The device of claim 1, wherein said air intake and/or said air outtake contain at least one source of UV-C light in addition to said air filter.

9. A method for adjusting ambient humidity level, comprising steps of, in any order:

receiving air into an air intake and expelling air through an air outtake;

filtering said air with an air filter functionally situated between said air intake and air outtake;

detecting a level of water vapor in ambient air in an interior space using a first humidity gauge;

condensing water vapor in air entering through said air intake into a water container using a dehumidifier;

storing condensed water in said water container;

drawing water from said water container and expelling air to said outtake, said air being more humid than said ambient air, using a humidifier functionally situated between said water container and said air outtake;

purifying water entering into and/or exiting from said water container with a purification mechanism;

wherein said humidifier and dehumidifier are substantially configured to refrain from operation at a same time;

wherein said air intake further comprises an inside air intake and an outside air intake and wherein said method further comprises a step of detecting a level of water vapor in ambient air in an exterior space using a second humidity gauge;

wherein said air device further comprises a first temperature gauge and second temperature gauge, said method further comprises steps of:

measuring an outside ambient temperature with said second temperature gauge and measuring an outside ambient humidity level with said second humidity gauge; and opening said outside air intake in a case in which a measured outside ambient temperature is above a first pre-set temperature level and a measured outside ambient humidity level is above a second pre-set humidity level.

10. The method of claim 9, said method further comprises a step of activating said humidifier based on said first humidity gauge detecting that said ambient humidity is below a first pre-set humidity level.

11. The method of claim 10, said method further comprises a step of activating said dehumidifier in response to detecting, using said first humanity gauge, that said ambient humidity is above said second pre-set humidity level.

12. The method of claim 9, wherein a desired ambient humidity level is a range which is substantially 50% of a maximum possible air humidity level and 30% of a minimum possible air humidity level.

13. The method of claim 9, said method further comprises a step of closing said outside air intake in a case in which a measured outside ambient temperature is below a second pre-set temperature level and a measured outside ambient humidity level is below said first pre-set humidity level.

14. The method of claim 9, said method further comprises a step of using one of said inside air intake and said outside air intake based on a comparison between a measured inside ambient temperature measured by said first temperature gauge and a measured outside ambient temperature measured by said second temperature gauge.

15. The method of claim 9, said method further comprises a step of using one of said inside air intake and said outside air intake based on a comparison between a measured inside ambient humidity level and a measured outside ambient humidity level.

16. The method of claim 9, said method further comprises a step of passing air within said intake and/or air within said outtake past at least one source of UV-C light in addition to said air filter.

* * * * *